United States Patent [19]
Stankwitz et al.

[11] Patent Number: 5,854,602
[45] Date of Patent: Dec. 29, 1998

[54] SUBAPERTURE HIGH-ORDER AUTOFOCUS USING REVERSE PHASE

[75] Inventors: Herbert C. Stankwitz; Ken W. Burgener, both of Ann Arbor, Mich.

[73] Assignee: Erim International, Inc., Ann Arbor, Mich.

[21] Appl. No.: 842,094

[22] Filed: Apr. 28, 1997

[51] Int. Cl.[6] .................................................. G01S 13/90
[52] U.S. Cl. ............................................. 342/25; 342/196
[58] Field of Search ........................... 342/25, 191, 192, 342/194, 196, 197

[56] References Cited

U.S. PATENT DOCUMENTS

| | | | |
|---|---|---|---|
| H741 | 5/1988 | Powell et al. ............................... | 342/25 |
| 4,471,357 | 9/1984 | Wu et al. ................................... | 342/25 |
| 4,771,287 | 9/1988 | Mims ......................................... | 342/25 |
| 4,963,877 | 10/1990 | Wood et al. ............................... | 342/25 |
| 4,965,582 | 10/1990 | Hellsten .................................... | 342/25 |
| 4,999,635 | 3/1991 | Niho ......................................... | 342/25 |
| 5,012,249 | 4/1991 | Chan ......................................... | 342/25 |
| 5,021,789 | 6/1991 | Shaw ......................................... | 342/25 |
| 5,043,734 | 8/1991 | Niho ......................................... | 342/25 |
| 5,179,383 | 1/1993 | Raney et al. ............................... | 342/25 |
| 5,184,134 | 2/1993 | Niho et al. ................................. | 342/25 |
| 5,430,445 | 7/1995 | Peregrim et al. .......................... | 342/25 |
| 5,440,309 | 8/1995 | Moreira et al. ............................ | 342/25 |
| 5,675,550 | 10/1997 | Ekhaus ....................................... | 367/7 |
| 5,677,693 | 10/1997 | Frankot et al. ............................ | 342/25 |

*Primary Examiner*—John B. Sotomayor
*Attorney, Agent, or Firm*—Gifford, Krass, Groh, Sprinkle, Patmore, Anderson & Citkowski

[57] ABSTRACT

A high-order synthetic aperture radar (SAR) autofocusing method decomposes phase error into basis function components, one order at a time. Image patches are partitioned into a plurality of subapertures in accordance with positive- and negative-going slope of the basis function at each order. A positive mask is applied to each subaperture within which the basis function is increasing in slope, whereas a negative mask is applied to each subaperture within which the basis function is decreasing in slope. The results are then correlated to obtain a focused image, with the principle of map-drift preferably being used to compute phase-amplitude weights. The method may be uniformly applied, enabling the steps to be performed at a plurality of increasingly higher orders without performance degradation.

9 Claims, 5 Drawing Sheets

SUBAPERTURE HIGH-ORDER AUTOFOCUS USING REVERSE PHASE

FIELD OF THE INVENTION

The invention relates generally to synthetic aperture radar and, more particularly, to an incremental autofocus technique which decomposes phase error into basis function components, one order at a time.

BACKGROUND OF THE INVENTION

Synthetic aperture radar, or SAR, has emerged as a valuable remote sensing tool. With SAR, cross-range resolution is enhanced by moving the antenna relative to a scene of interest. Alternatively, the radar may remain stationary while a target moves past, a process known as inverse SAR. Many comprehensive textbooks are available on the subject of synthetic aperture radar, and may be used for background information.

High-resolution SAR systems are particularly prone to degradation due to uncompensated phase errors. These phase errors may arise from a number of factors. As used herein, "autofocus" represents a procedure associated with the automatic determination and correction of phase errors in a high-resolution SAR system.

In most SAR image formation processors used today, automatic determination of phase errors is typically carried out using subaperture correlation of some kind. A drawback of existing techniques is the difficulty of extracting phase errors of higher orders; for example, order 4 or greater. In one technique, for example, the aperture is divided up into an arbitrarily small number so as to cancel out phase error on a piecemeal basis. At high orders, however, the ability to distinguish between desired signal and noise due to phase error becomes increasingly difficult, limiting the approach to lower orders. At higher orders, the number of correlations between subapertures using this technique becomes compounded, resulting in a very computationally intensive approach with diminishing returns. The need remains, therefore, for an autofocus technique which reliably and with fidelity measures and connects phase errors, particularly at higher orders.

SUMMARY OF THE INVENTION

The present invention provides a method of autofocusing a synthetic aperture radar (SAR) image using a phase correction algorithm which exhibits much less performance degradation at increasingly higher orders than previous techniques. In contrast to existing subaperture correlation approaches, subapertures are generated in accordance with positive- and negative-going slope of the basis function slope, with incoherent map-drift correlation techniques being used to measure (both high and low order) phase-errors. Any suitable basis function may be used for the decomposition, including Fourier or Legendre.

Upon receiving a complex, unfocused SAR image which can be partitioned into a number of smaller image patches, each patch is partitioned into a plurality of subapertures, with each partition being associated with the maxima and minima of the basis function for the current order. A positive mask is then applied to each subaperture within which the Fourier basis function is increasing in (phase) slope, whereas a negative mask is applied to each subaperture within which the basis function is decreasing in slope. The results are then correlated, preferably using map-drift principles, to obtain a focused image. Since the method is uniformly applied, applicable steps may be performed at a plurality of increasingly higher orders without performance degradation.

In a preferred embodiment, the step of processing each patch may further include the following steps:

performing an inverse Fourier transformation on the image patch to generate a range-compressed image patch in the signal domain;

applying any lower-order phase corrections to the range-compressed image patch, if such corrections were previously carried out;

partitioning the Fourier transform of each patch into a plurality of subapertures, each partition being associated with the maxima and minima of the basis function for the current order;

applying a positive mask to each subaperture if the slope of the Fourier basis function is increasing within that aperture, and applying a negative mask to each subaperture if the slope of the Fourier basis function is decreasing within that aperture; and performing a Fourier transformation and magnitude detection on the positively and negatively-masked subapertures.

DETAILED DESCRIPTION OF THE PREFERRED EMBODIMENT

The present invention provides an autofocus technique for use in synthetic aperture radar systems which exploits subaperture reverse phase as a way of measuring and correcting phase error at high orders. Indeed, the approach is consistent regardless of order number, and may be used at increasingly higher orders, while being limited only by tradeoffs as to computation intensity versus desired results. In contrast to existing techniques, which arbitrarily break up the image aperture into a number of subapertures for curve-fitting purposes, the present invention utilizes masks determined by the slope of an underlying basis function at each order, to cancel out phase error.

More particularly, the method of this invention implements an incremental autofocus function, decomposing phase error into basis function components, one order at a time. The approach preferably utilizes subaperture map-drift (incoherent) correlation to compute base function weights, relying on signal-domain masks generated from the basis function at each order taking positive and negative phase slope into account.

Figure 1:
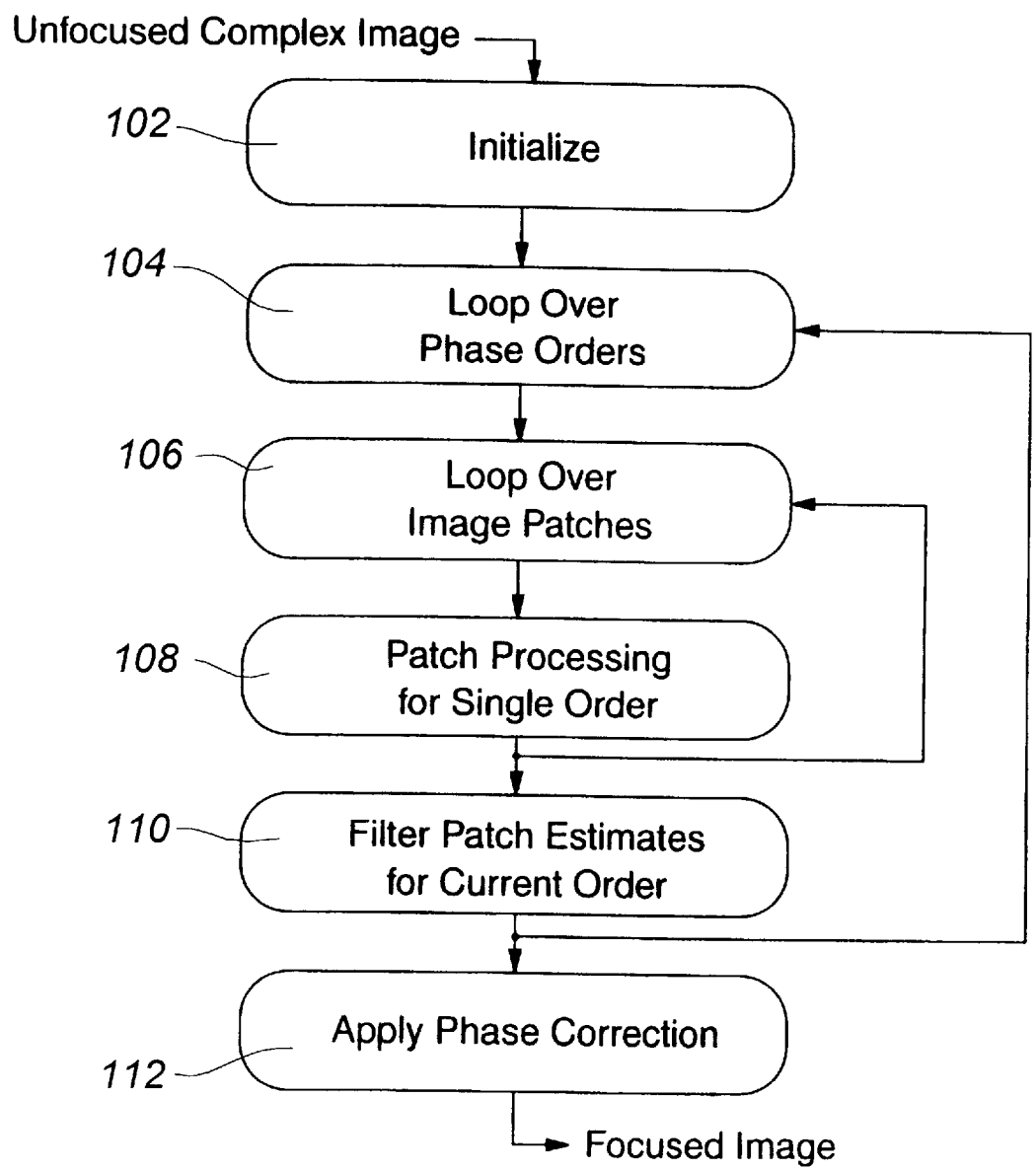
FIG. 1 simplified flow diagram identifying steps associated with the focusing of a complex image according to the invention.

As shown in FIG. 1, the technique according to this invention receives and initializes an unfocused complex image at block 102. For each phase order, as indicated by block 104, a number of image patches are processed, in looping fashion, as depicted by blocks 106 and 108. For each patch, a patch estimate is calculated for the current order of basis function, as indicated at block 110, then, having looped over all total phase orders of interest, a total phase correction is applied at block 112, resulting in a focused image.

Figure 2:
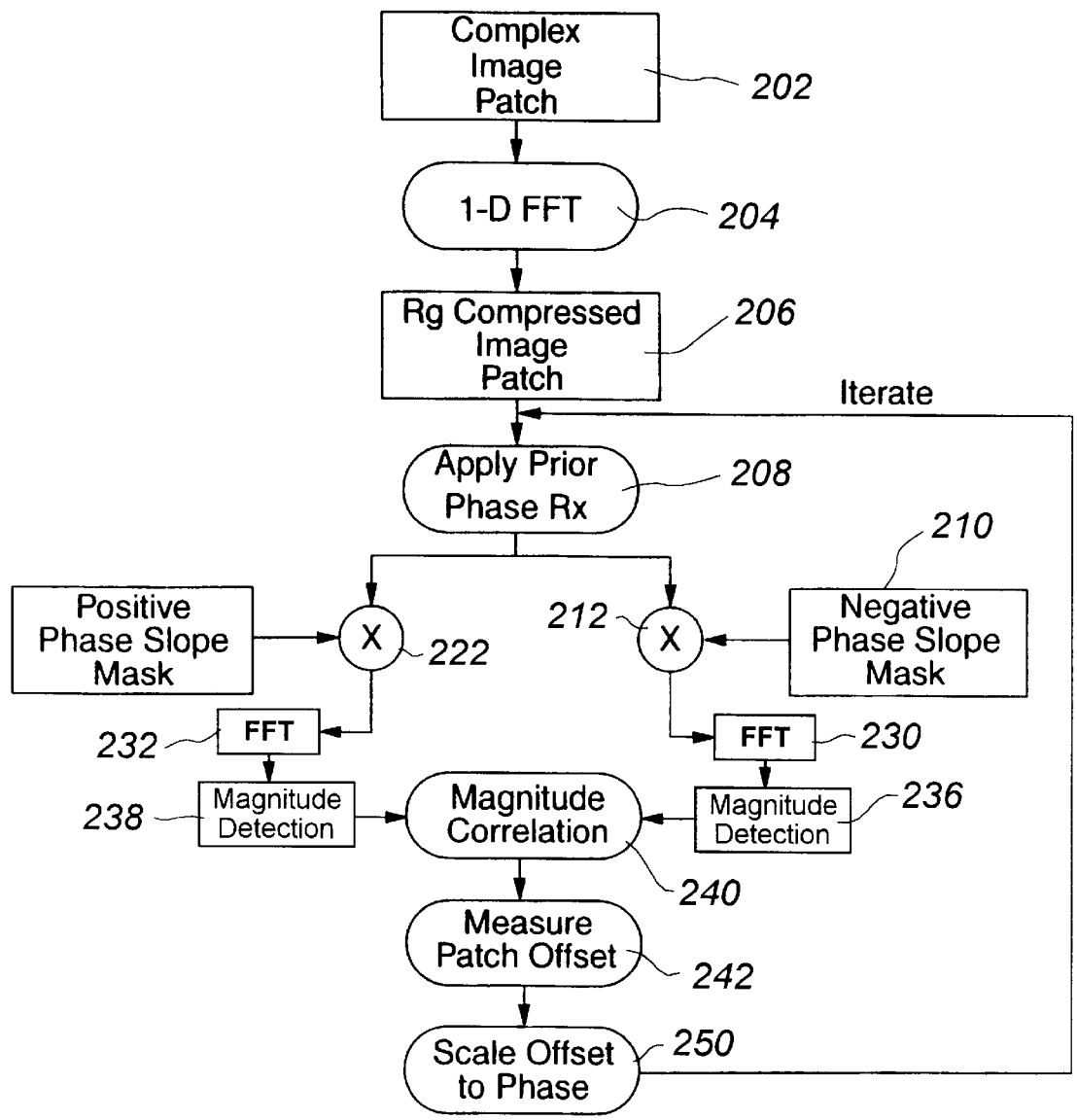
FIG. 2 is a flow diagram providing more detail as to image patch.
Figure 3:
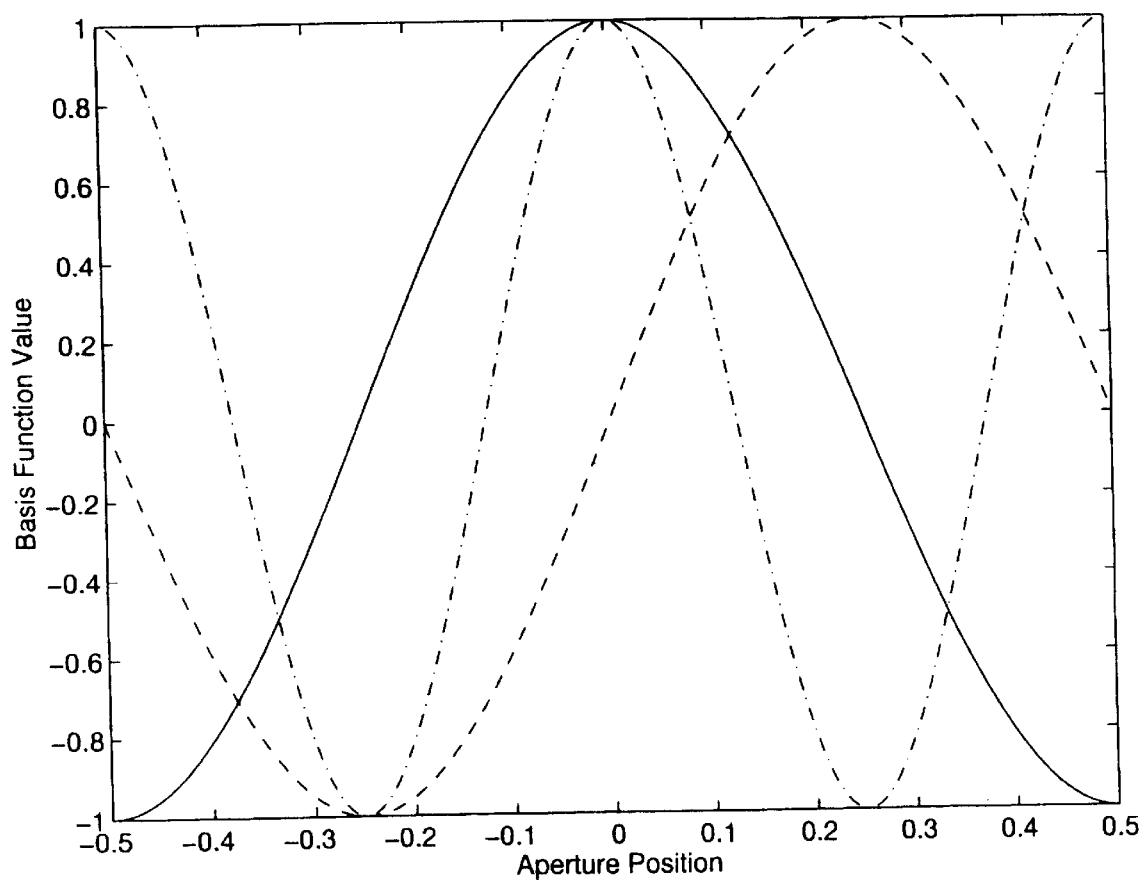
FIG. 3 is a drawing which shows Fourier basis functions for orders 2, 3 and 4.

Turning to FIG. 2, there is shown a flow diagram associated with image patch flow for a particular order. At block 202, the complex image patch is received, after which a one-dimension fast Fourier transform is computed at block 204. This results in a range-compressed image patch at block 206. At this point, an iteration takes place with positive or negative phase slope masks are applied, as appropriate, to phase correct to the greatest order of interest. At block 208, the application of a prior phase correction factor implies that at least a quadratic or second-order correction has taken place, with the iterations being used to correct for higher orders. Again, the Fourier basis functions for orders 2, 3 and 4 are shown as a function of positive and negative phase-slope.

Figure 4A:
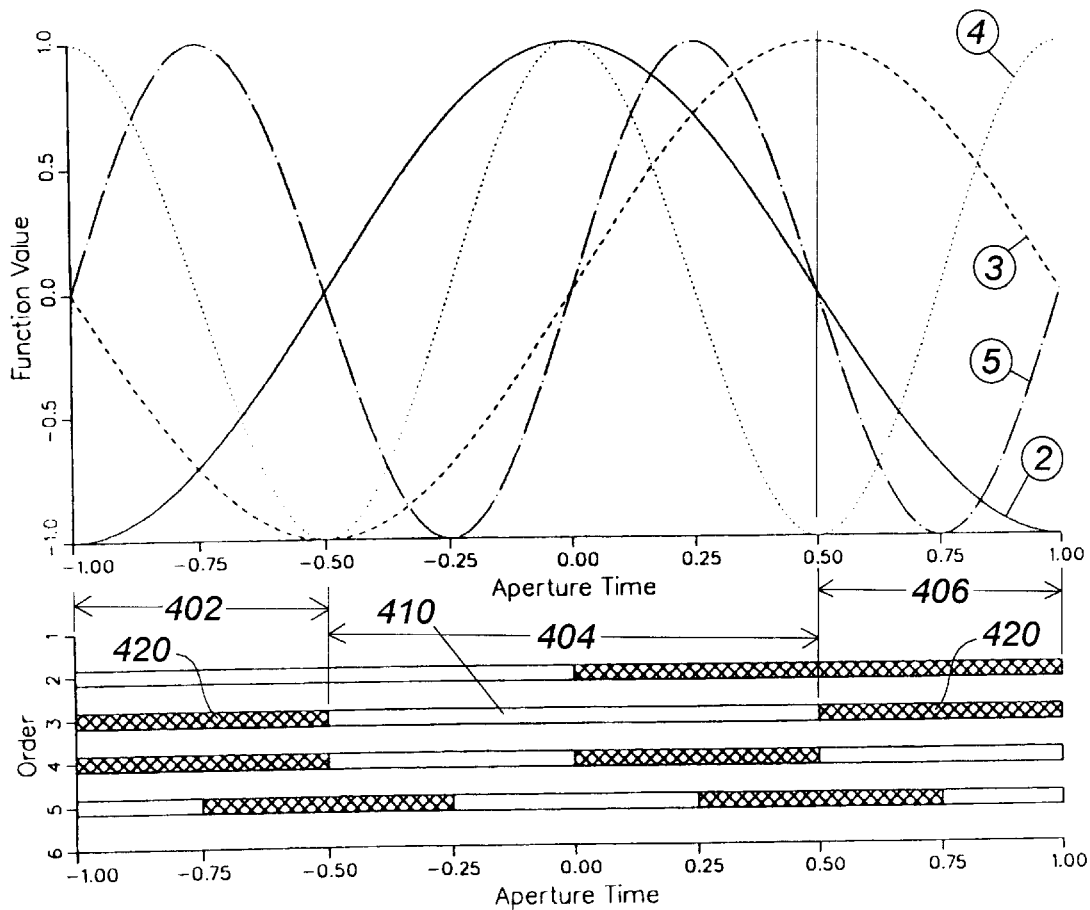
FIG. 4A is a drawing which depicts Fourier basis functions up to order 5, and masks used as a function of aperture time according to the invention.
Figure 4B:
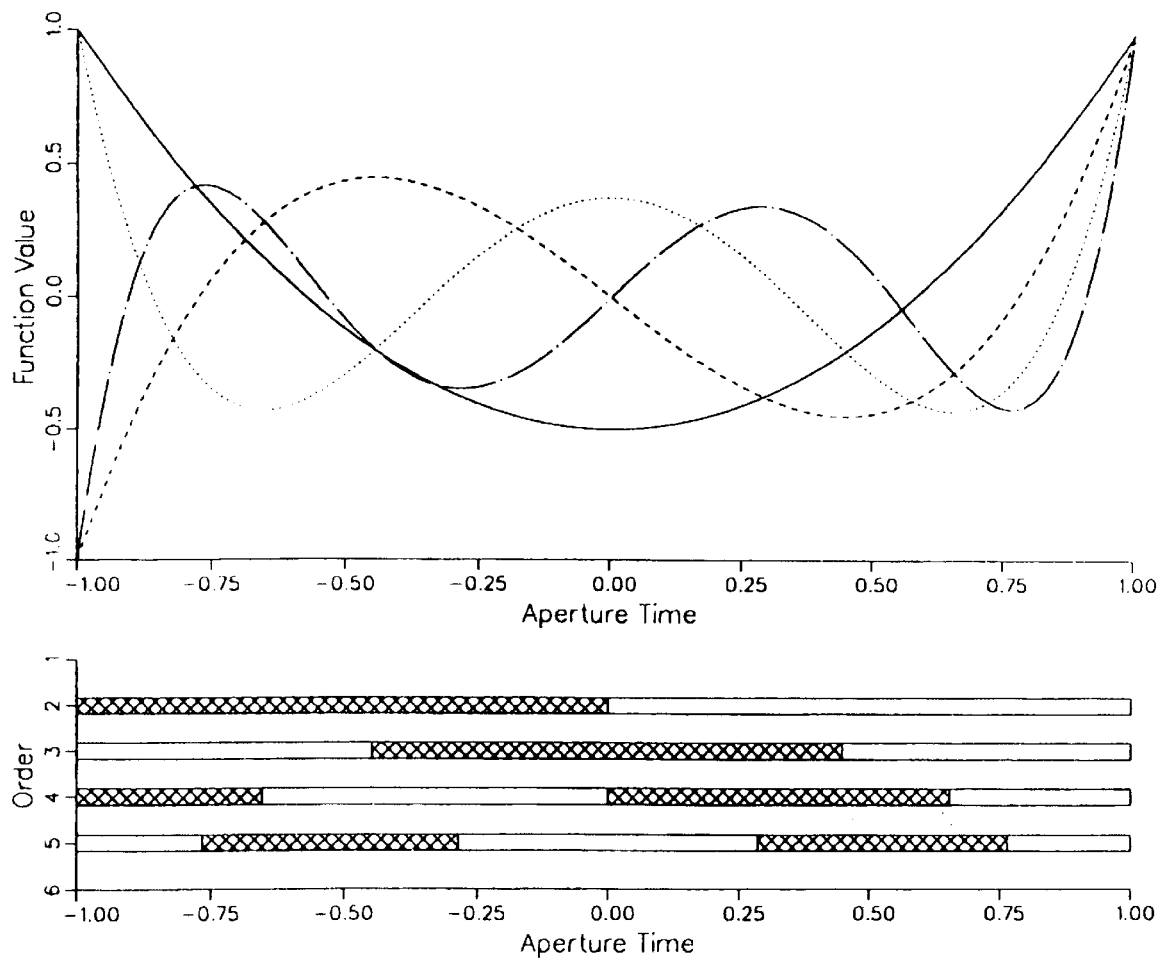
FIG. 4B is a drawing which shows Legendre functions up to order 5, again, with masking operations identified as a function of aperture time.

FIG. 4A illustrates masks used for Fourier basis functions of orders 2 to 5. Using order three as an example, the basis function includes a first portion 402 exhibits a negative slope, a central portion 404 exhibits a positive slope, and a rightmost portion 406, shows a slope again being negative. According to the invention, the aperture is divided into subapertures using vertical lines intersecting at maxima and minima, and a slope mask 410 is generated to pass all negative slopes, whereas a different mask, 420 is used to block all negatives slopes but pass the positive slopes. FIG. 4B depicts a similar arrangement for Legendre functions, as opposed to Fourier functions.

Referring back to FIG. 2, these masks are generated at blocks 210 and 220 and applied at points 212 and 222. Upon application of each slope mask, a forward fast Fourier transform is taken of each result at blocks 230 and 232, followed by a magnitude detection 236 and 238, respectively, in conjunction with negative and positive slope.

Following magnitude detection for the negative and positive cases, a magnitude correlation is carried out at block 240, followed by a measure of patch offset at block 242. In the preferred embodiment, the principle of map drift is used to measure this offset to generate a correction for the current phase, which is also applied in the prior phase correction, and continued through iteration until the process completes. The map drift principle is based on the premise that an arbitrary phase error can be defined by a linear combination of Legendre polynomials, as described in the paper "Higher Order Autofocus Via Mapdrift and Single Term Polynomials," which is being submitted herewith in an accompanying Information Disclosure Statement and is incorporated in its entirety by reference. According to this principle, candidate offsets are applied to the image patch and iterated, each time examining the result, until a substantially similar or identical answer is achieved, indicating that solution to the mapdrift equation is taken place. After the offset is scaled to phase, at block 250, the process repeats through iteration until this consistent result is obtained.

The patch estimates for the current order are then filtered, as indicated at block 110 in FIG. 1, and the process is repeated for the next higher order. When all image patches have been looped over for that order the phase correction factor is applied at block 112 which leads to the generation of the focused image 114.

That claimed is:

1. A method of autofocusing a synthetic radar (SAR) image, comprising the steps of:

(a) receiving a complex, unfocused SAR image comprised of a plurality of image patches;

(b) partitioning the Fourier transform of each patch into a plurality of subapertures, each partition being associated with the maxima and minima of a basis function for the current order;

(c) applying a positive mask to each subaperture wherein the basis function is increasing in phase slope, and applying a negative mask to each subaperture wherein the basis function is decreasing in phase slope; and (d) correlating the results of the masking, operations of step (c) to obtain a focused image.

2. The method of claim 1, wherein the basis function is a Fourier basis function.

3. The method of claim 1, wherein the basis function is a Legendre basis function.

4. The method of claim 1, wherein steps (b) and (c) are repeated for each of a plurality of increasingly higher orders.

5. The method of claim 1, wherein the step of correlating is based on map-drift.

6. A method of autofocusing a synthetic aperture radar (SAR) image, comprising the steps of:

receiving a complex, unfocused SAR image comprised of a plurality of image patches;

processing each patch at a plurality of orders wherein, at each order, the patch is divided into a plurality of subapertures according to the change in basis function slope for that order, and masked as a function of positive-going and negative-going basis function slope; and correlating the results of the previous step to obtain a focused image.

7. The method of claim 6, wherein the basis function is a Legendre basis function.

8. The method of claim 6, wherein the basis function is a Fourier basis function.

9. The method of claim 8, wherein the step of processing each patch further includes the steps of:

receiving a complex image patch;

performing an inverse Fourier transformation on the image patch to generate a range-compressed image patch in the signal domain;

applying any lower-order phase corrections to the range-compressed image patch, if such corrections were previously carried out;

partitioning the patch into a plurality of subapertures, each partition being associated with the maxima and minima of the Fourier basis function for the current order;

applying a positive mask to each subaperture if the slope of the Fourier basis function is increasing within that aperture, and applying a negative mask to each subaperture if the slope of the Fourier basis function is decreasing within that aperture; and performing a Fourier transformation and magnitude detection on the positively and negatively masked subapertures.

\* \* \* \* \*